Sept. 19, 1961  R. G. FRANK  3,000,331
COATED TABLET PRESS
Filed Jan. 28, 1957  6 Sheets-Sheet 1

*INVENTOR.*
Raymond G. Frank
BY
Adams, Forward & McLean
ATTORNEYS

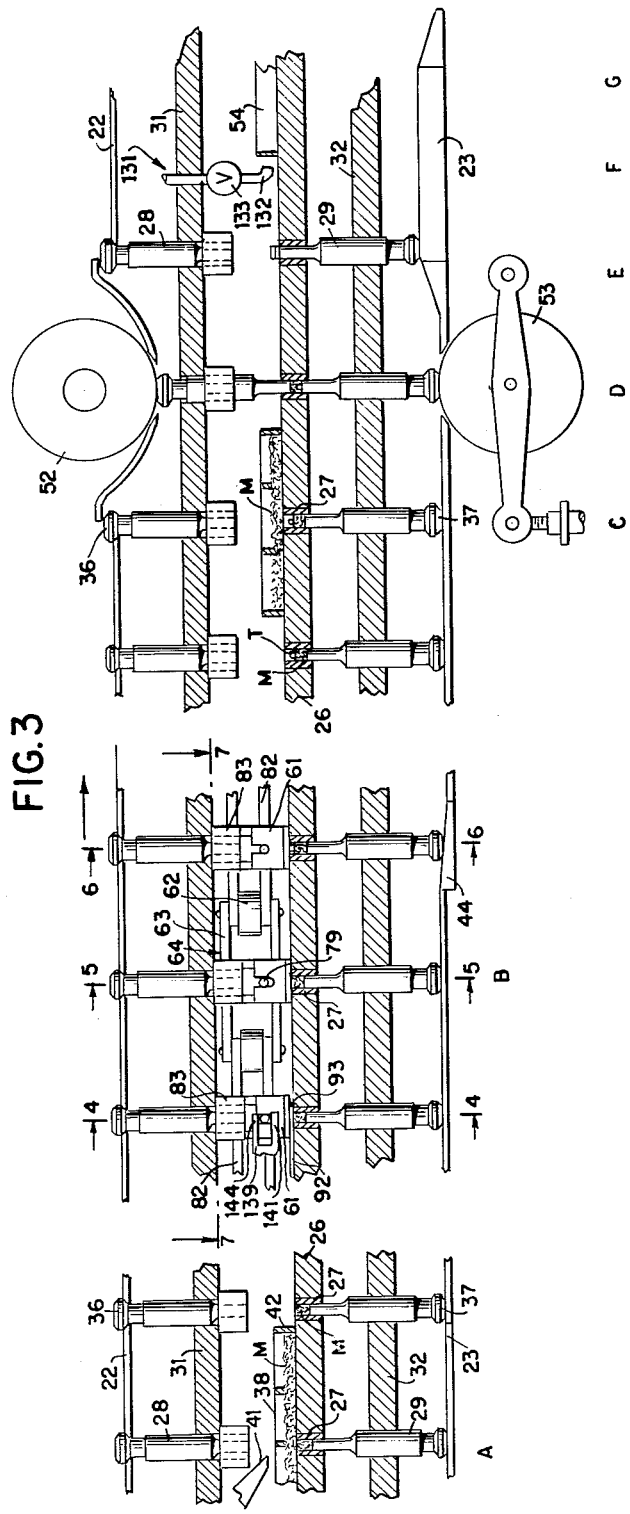

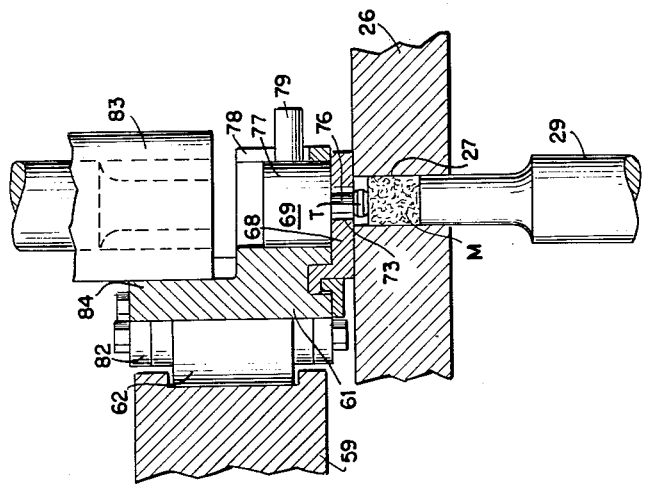
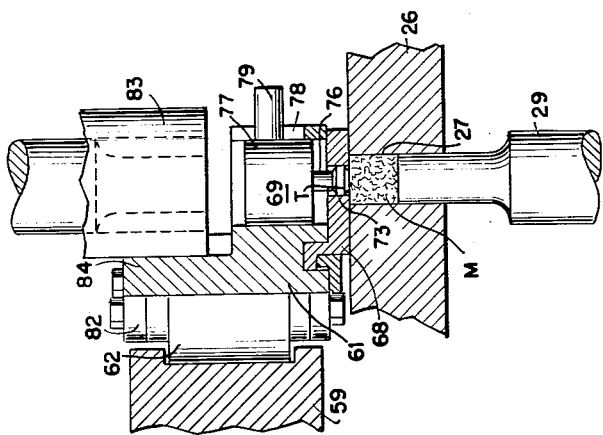
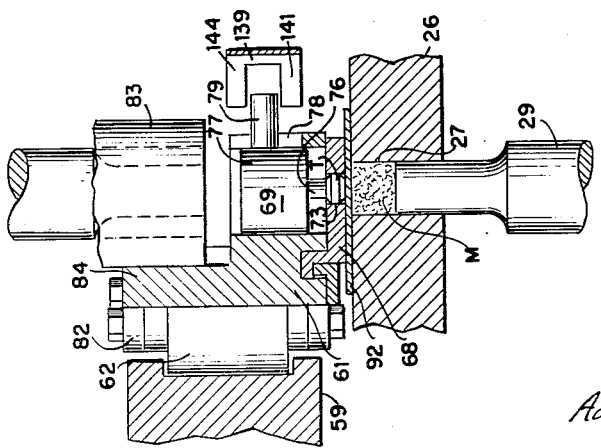
INVENTOR.
Raymond G. Frank

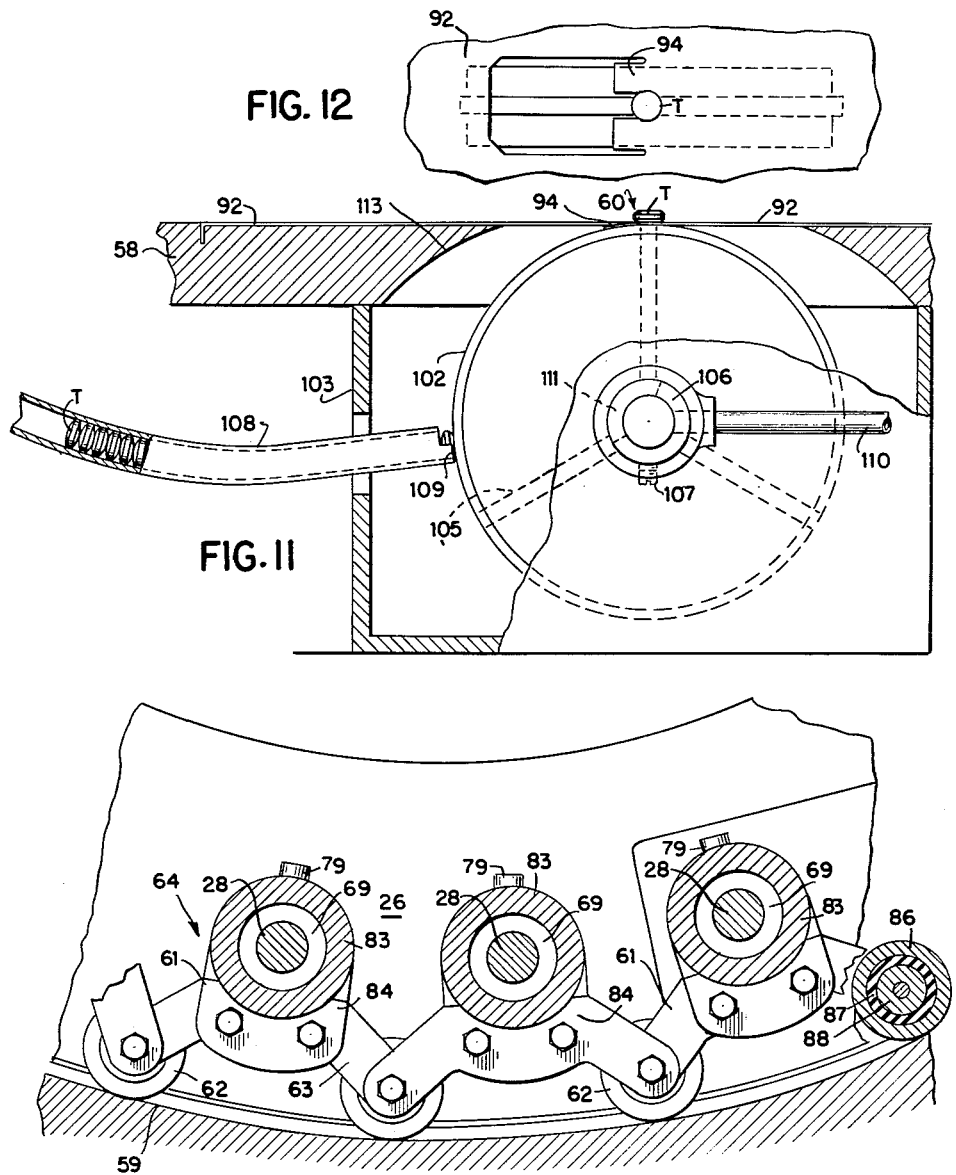

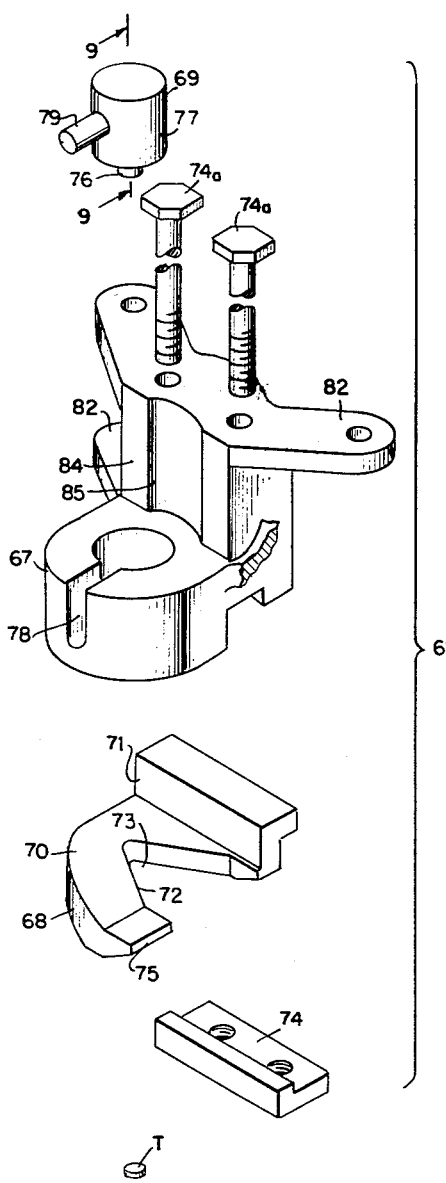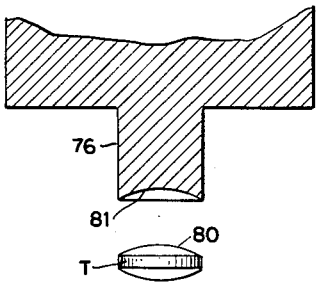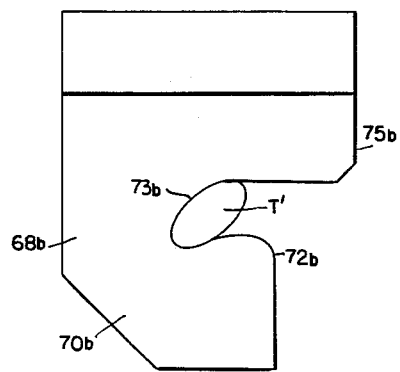

United States Patent Office 3,000,331
Patented Sept. 19, 1961

3,000,331
COATED TABLET PRESS
Raymond G. Frank, Ambler, Pa., assignor to F. J. Stokes Corporation, Philadelphia, Pa., a corporation of Pennsylvania
Filed Jan. 28, 1957, Ser. No. 636,677
18 Claims. (Cl. 107—1)

This invention relates to the manufacture of coated tablets. More particularly, it relates to the manufacture of coated tablets with a rotary tablet press.

Coated tablets generally comprise a body portion or core, and a covering which overlies the body portion. In this specification and in the appended claims, the body portion is referred to as a "tablet" and the covering is referred to as a "coating," and the composite article is referred to as a "coated tablet."

Many materials can conveniently be marketed in the form of coated tablets. Thus, candy, chewing gum, and medicines are commonly marketed in this form. Usually, the tablet contains the desired values and the coating is of different composition and is applied in order to impart to the composite article, i.e. the coated tablet, suitable storage properties, appearance or taste.

It has been proposed heretofore to make coated tablets with a rotary tablet press. Such a press comprises a horizontally disposed rotating die head having vertical die cavities extending therethrough. Aligned with each die cavity is an upper punch disposed above the die head and a lower punch disposed below the die head. The upper and lower punches are mounted for rotation with the die head and ride, respectively, on an upper and lower cam track. When used to make coated tablets, the cam tracks are formed and the press is provided with auxiliary devices so that as the die head and the punches rotate through one revolution, each die cavity passes in sequence through a first filling operation in which coating material in pulverant form is charged to each die cavity, a tablet delivery operation in which a tablet is delivered to each die cavity, a second filling operation in which additional coating material in pulverant form is charged to each die cavity, and a compression operation in which the contents of each cavity are compressed to form a coated tablet. Rotary presses for making coated tablets are described in United States Patents 1,248,571 and 2,700,038.

In the machines described in these United States patents, the tablets are delivered to the die cavities by tablet movers disposed about the periphery of a wheel which partially overlaps the upper surface of the horizontally disposed die head. The wheel is disposed so that the tablet pockets of the tablet movers come into vertical alignment with the die cavities at a point in the path of the die cavities. At this point the tablet pockets and die cavities come into open communication and tablets pass from the tablet pockets to the die cavities. It has been found that machines operating in this manner are difficult to adjust so that the rotation of the wheel and the die head are suitably coordinated. I have discovered means for making coated tablets with a rotary press which is free of this disadvantage, and which permits higher production rates than are practical with presses using a wheel to feed tablets to the die cavities.

According to the invention, a tablet is delivered to each die cavity by moving a tablet with a tablet mover along an arc portion of the path of the die cavity in vertical alignment with the die cavity, and depositing the tablet at the die cavity while so moving the tablet.

In a preferred embodiment of the invention, a tablet is delivered to each die cavity by moving the tablet contained in the tablet pocket of a tablet mover into vertical alignment with the die cavity, and while maintaining such alignment depositing the tablet at the die cavity and then simultaneously moving the tablet pocket along an arc portion of the path of the die cavity and lowering the tablet relative to the tablet mover so that the tablet mover clears the tablet and then withdrawing the tablet mover from alignment with the path of the die cavity. Advantageously, the tablet is pushed downwardly while being deposited at the die cavity and while the tablet is being lowered relative to the tablet mover.

When the rotary press is operated in the usual manner, the die cavity is filled with pulverant material when the tablet is deposited at the die cavity. By the method of the invention the tablet can be accurately positioned on the pulverant material and, as the tablet is lowered so that it clears the tablet mover before the tablet mover is withdrawn from alignment with the path of the die cavity, the likelihood that movement of the tablet mover following deposit of the tablet will displace the tablet is eliminated. The improved results realized by the method of the invention may be attributable in part at least to this characteristic of the method.

The invention also provides an improved rotary coated tablet press. The improved tablet press is provided with a tablet delivery means which includes tablet movers each having a tablet pocket for delivering tablets to the die cavities and means for moving the tablet movers into vertical alignment with and then along an arc portion of the path of the die cavities with tablet pockets vertically aligned with die cavities. Means are provided for depositing the tablets contained in the tablet pockets at the die cavities while the tablet movers travel along the arc portion, and for withdrawing the tablet movers from alignment with the arc portion after delivery of tablets contained in the tablet pockets.

In a preferred embodiment, the tablet delivery means includes a track for the tablet movers fixedly mounted and disposed to direct the tablet pockets into vertical alignment with the path of the die cavities, along the arc portion of the die cavity path and then away from alignment with the die cavity path, and means are also provided for lowering the tablets relative to the tablet movers after deposit of the tablets at the die cavities and while the tablet pockets move along the arc portion.

The apparatus of the invention includes improved means for obtaining accurate alignment of the tablet pockets and the die cavities at the moment that the tablet is deposited at a die cavity. According to the invention, each of the upper punches (or lower punches) is mounted in a bushing secured to the die head, and each tablet mover is provided with a collar rigidly secured thereto and adapted to engage a punch bushing simultaneously on each side of a plane passing through the center line of the bushing and the center line of the rotary press, and the tablet movers are mounted on rubber loaded wheels which ride on the tablet mover track. As the tablet movers are moved into the path of the die cavities, the collars secured to the tablet movers come into engagement with the punch bushings, and as the tablet movers are mounted on rubber loaded wheels minor adjustment between the collars and bushings occurs automatically. This results in play between the tablet guides and the die cavities being eliminated and results in accurate alignment.

The invention also provides an improved tablet mover. The tablet mover of the invention comprises a body portion, a horizontal guide and a vertical guide. The horizontal guide is secured to the bottom of the body portion and is formed to bound the tablet pocket. The vertical guide is slidably mounted for vertical movement in the body portion and is aligned with the tablet pocket.

The vertical guide has a working pin adapted to rest on a tablet contained in the tablet pocket and a weight resting on the working pin urging it downwardly when the pin rests on a tablet contained in the tablet pocket. The provision of a vertical guide increases the accuracy with which a tablet may be deposited at a die cavity. Moreover, when used in practicing the method of the invention wherein the tablet is lowered relative to the tablet mover before the tablet mover is withdrawn from the path of the die cavity, the vertical guide can conveniently be employed to guide the tablet as it is lowered into the die cavity.

The invention also provides an improved tablet feeder for separating individual tablets from a collection thereof and delivering them one at a time to a pick-up station where they are picked up by the tablet movers. The tablet feeder comprises a vacuum wheel having a vacuum tube extending from adjacent the center thereof to the periphery thereof. A tablet delivery tube adapted to contain a stack of tablets is positioned with its exit end adjacent a point in the path of the outer end of the vacuum tube. Means are provided for applying a vacuum to the vacuum tube and for rotating the vacuum wheel. As the vacuum tube passes the exit end of the delivery tube, a single tablet is drawn from the delivery tube onto the end of the vacuum tube, and as the wheel continues to rotate, the tablet is carried to the pick-up station where it is removed from the vacuum tube. Advantageously, a vibratory tablet orientation device is connected to the delivery tube for supplying tablets thereto.

The coating of a coated tablet usually completely covers the table, and hence in general it is not possible to tell from the appearance of the coated tablet that it in fact contains a tablet. Accordingly, it is advisable to employ in the manufacture of coated tablets some means to insure that a tablet is present. In the manufacture of coated tablets on a rotary tablet press, the die cavities usually pass through several operations comprising at least one filling operation in which the die cavities are filled with pulverant coating material, a tablet delivery operation in which the tablets are deposited at the die cavities, a compression operation which is carried out after the last filling operation and the tablet delivery operation and in which the contents of the die cavities are compressed and coated tablets are formed therefrom, and a removal operation in which the coated tablets are removed from the rotary press and directed to a collection point. As a consequence of this sequence of operations, if, for some reason the tablet delivery device fails to deposit a tablet at the die cavity during the tablet delivery operation, a product consisting entirely of coating material and containing no tablet will be produced and this product will have the form and appearance of a coated tablet. To preclude commingling of such imperfect production with the coated tablets gathered at the collection point, the rotary press of the invention is provided with an inspection device which checks the operation of the tablet delivery device, and a rejection means which rejects imperfect production by routing it away from the collection point. The inspection device comprises level indicators installed one on each of the tablet movers. Each level indicator is adapted to indicate the level in the tablet pocket with which it is associated, and hence indicates the presence or absence of a tablet in the tablet pocket. The rejection means is positioned ahead of the position at which the last coating material filling operation is carried out, and conveniently, is positioned ahead of the compression position. To coordinate the operation of the inspection device and the rejection means there is provided a time delay unit which can advantageously be a memory wheel of the type described in my copending application Serial No. 636,678, filed January 28, 1957, and now U.S. Patent No. 2,906,214 dated September 29, 1959. The time delay unit is responsive to each of the level indicators and is effective to operate the rejection means when the imperfect production arrives at the point where the rejection means is positioned.

An embodiment of the invention is shown in the accompanying drawings of which:

FIG. 3 is a development in vertical section depicting schematically the operation of the press shown in FIG. 1;

FIG. 4 is a vertical section taken along line 4—4 of FIG. 3;

FIG. 5 is a vertical section taken along line 5—5 of FIG. 3;

FIG. 6 is a vertical section taken along line 6—6 of FIG. 3;

FIG. 7 is a horizontal section taken along line 7—7 of FIG. 3;

FIG. 8 is an expanded view of a tablet mover according to the invention;

FIG. 9 is a vertical section taken along line 9—9 of FIG. 8 and showing a tablet such as can be manipulated by the tablet mover;

FIG. 10 is a plan view of an alternate part for a part of the tablet mover shown in FIG. 9;

FIG. 11 is an elevation of a tablet feeder according to the invention viewed from line 11—11 in FIG. 1;

FIG. 12 is a plan view of a portion of the tablet feeder shown in FIG. 11;

Figure 1:
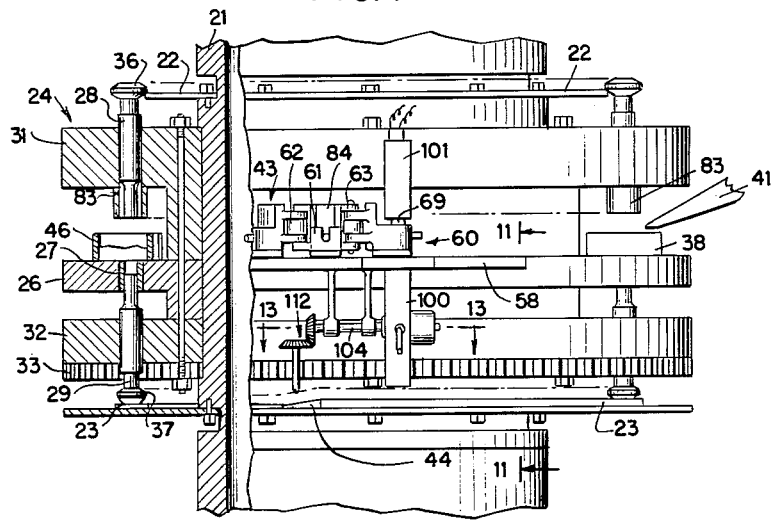
FIG. 1 is an elevation partially broken away of a rotary coated tablet press of the invention viewed from line 1—1 in FIG. 2.
Figure 2:
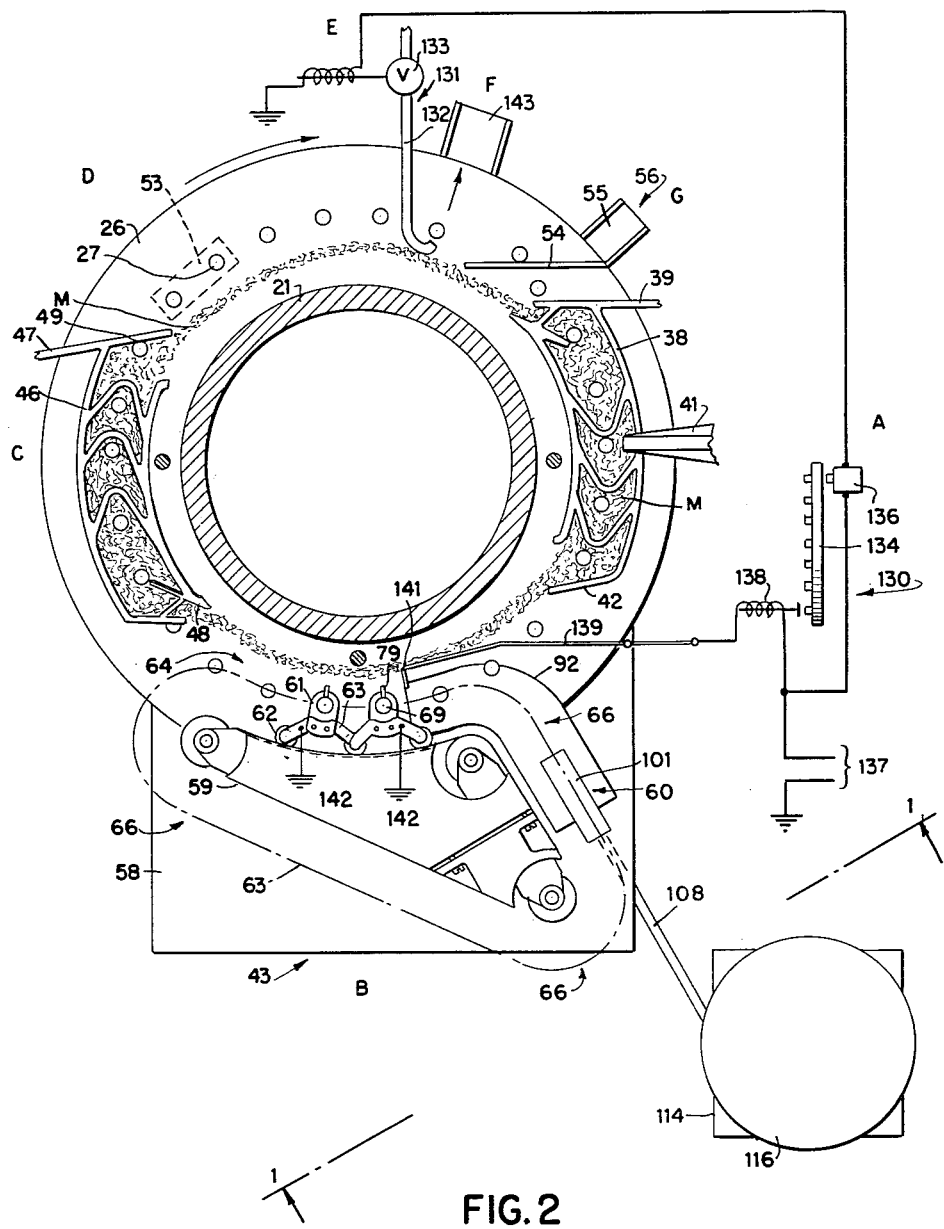
FIG. 2 is a plan view of the rotary press shown in FIG. 1 with a portion of the upper part of the rotary press removed.

Referring to the drawings and particularly to FIG. 1, FIG. 2 and FIG. 3, there is there shown a rotary coated tablet press comprising a pedestal 21 having fixedly secured thereto an upper cam track 22 and a lower cam track 23. A head assembly 24 is rotatedly mounted on the pedestal and comprises a die head 26, upper punches 28 and lower punches 29, upper punch guide block 31 and lower punch guide block 32, and drive gear 33. The upper and lower punches are slidably mounted in the upper punch guide block and lower punch guide block, respectively, and an upper punch and a lower punch are vertically aligned with each of the vertical die cavities 27 which are disposed in the die head 26. The heads 36 of upper punches 28 ride on the upper cam track 22 and the heads 37 of the lower punches 29 ride on the lower cam track 23. The die head, punch guide blocks, and drive gear are secured together so that the head assembly 24 rotates as a unit about the pedestal 21. Suitable drive means, not shown, are connected to the head assembly drive gear 33 to rotate the assembly.

The cam tracks are formed and the press is provided with auxiliary devices so that as the head assembly rotates clockwise as viewed in FIG. 2 through one complete revolution the die cavities pass through a series of positions where various operations are performed. Thus, each die cavity passes through a first coating material filling position A, a tablet delivery position B located ahead of the first coating material filling position, a second coating material filling position C located ahead of the tablet delivery position, a compression position D located ahead of the second coating material filling position, an ejection position E located ahead of the compression position, a rejection position F located ahead of the ejection position, and a removal position G located ahead of the rejection position.

At position A, a bottomless trough 38 secured to the pedestal 21 by the arm 39 rests on the die head, and the lower cam track 23 is formed so that the lower punches extend part way into the die cavities. Tablet coating material M in pulverant form drops from the hopper 41 into the trough 38 and falls by gravity into the die cavities as they move through this position. As the die cavities leave position A, wiper blade 42 which is secured to the forward end of the trough 38 wipes excess coating material inwardly over the die head and away from the path of the die cavities.

At position B, a tablet T is deposited at each die cavity by tablet delivery device 43. Following deposit, the tablets are lowered into the die cavities to at least the level of the upper surface of the die head, and usually to below the level of the upper surface of the die head in order to provide space required for additional pulverant material to be added at position C. Lowering is effected by lowering cam 44 which is positioned in the portion of lower cam track 23 associated with position B.

At second coating material filling position C, a bottomless trough 46 secured to the pedestal 21 by the arm 47 rests on the die head. Coating material carried by the die head 26 from position A to position C is guided to the trough 46 by guide arm 48 which is secured to the rearward end of the trough 46. The coating material drops into the die cavities as they pass through this position, and as the die cavities leave this position, wiper blade 49 wipes excess coating material inwardly over the die head and away from the path of the die cavities.

At compression position D the upper and lower cam tracks comprise respectively, pressure roll 52 and adjustable pressure roll 53. These rolls force each set of confronting punches toward each other and thus compress the contents of the die cavities and form therefrom coated tablets.

At ejection position E lower cam track 23 is formed so that the lower punches 29 are raised to the level of the upper surface of the die head. Thus, the tablets are ejected from the die cavities at this position.

During normal operation the coated tablets will pass through rejection position F without incident, and then on to removal position G where they are deflected by removal guide 54 from the path of the die cavities to the periphery of the die head 26. From here the tablets drop into chute 55 which guides them to collection point 56.

*Tablet delivery device*

The tablet delivery device 43 located at position B comprises a fixedly positioned table 58 having mounted thereon an endless track 59. The track is arranged to provide a working flight 64 and a return flight 66 for an endless chain 63 of tablet movers 61. The tablet movers are mounted on wheels 62 which are positioned so that they ride on the track 59. The chain track 59 is positioned to direct the tablet movers into the path of the die cavities over the working flight along an arc portion of the die cavity path and then away from the die cavity path and onto the return flight. During the working flight, the tablet movers deliver tablets to the die cavities, and during the return flight, the tablet movers pass through pick-up station 60 where they pick up tablets for delivery to the die cavities during the working flight. Novel features of my invention reside in the tablet movers and in the manner employed to align the tablet pockets of the tablet movers with the die cavities.

As shown in the drawings (FIG. 8), tablet mover 61 comprises a cylindrical body portion 67, a horizontal guide 68 for guiding a tablet horizontally and a vertical guide 69 for guiding the tablet vertically. The horizontal guide bounds the tablet pocket 73 which is adapted to contain the tablet T, and comprises a flat plate 70 having a step 71 along one side, and a deep notch 72 which extends rearward from the leading edge 75 and leads to the tablet pocket 73. The horizontal guide is secured to the body portion 67 by bracket 74 which fits under step 71 and is itself secured to the body portion by bolts 74a. The position of the horizontal guide relative to the body portion may be adjusted by loosening the bolts and moving the flat plate 70. Thus, the horizontal guide may be adjusted horizontally to accommodate different size tablets or permit accurate positioning of tablets in the tablet mover.

The horizontal guide shown in FIG. 8 is well suited for use in moving short cylindrical tablets such as tablet T as the tablet T may be positioned in the horizontal guide by moving the guide so that the sides of notch 72 direct the tablet to the tablet pocket 73. Other horizontal guides may advantageously be employed for differently shaped tablets. Thus, when it is desired to employ the tablet mover to manipulate ellipsoidal tablets, horizontal guide 68b shown in FIG. 10 may advantageously be employed. The flat plate 70b of this guide is provided with a chute 72b formed so that a tablet T' entering the chute adjacent the leading edge 75b will be directed to the tablet pocket 73b.

The vertical guide 69 is slidably mounted within the body portion 67. The vertical guide is aligned with tablet pocket 73 and comprises a working pin 76 which rests on the tablet T, and a weight 77 which rests on the working pin and urges it downwardly when the pin rests upon the tablet T. As is best seen in FIG. 9, the lower end 81 of the working pin 76 is dished so that it conforms to the surface 80 of the tablet T which it engages.

Advantageously, the cylindrical body portion 67 of the tablet mover is provided with a vertical slot 78 and the vertical guide is provided with a lock pin 79 adapted to travel in slot 78. The lock pin serves the function of limiting the travel of the vertical guide and additionally adapts the vertical guide for use in making tablets of noncircular form as it will prevent rotational movement of the vertical guide and thus will permit maintaining a fixed orientation of a tablet in the tablet pocket.

The tablet mover is provided with arms 82 which permit mounting the tablet mover on wheels and joining several tablet movers together to form a chain.

The means provided for obtaining alignment of the tablet pockets of the tablet movers and the die cavities will be best understood by reference to FIG. 1, FIG. 7, and FIG. 8. A bushing 83 fixedly secured to punch guide block 31 surrounds each of the upper punches 28 (FIG. 1), and each tablet mover 61 is provided with an upwardly extending collar 84 which is rigidly secured to the body portion 67 of the tablet mover (FIG. 8). Each collar 84 is formed so that its inner surface 85 is adapted to engage one of the punch bushings 83 simultaneously on each side of a plane passing through the center line of the bushing and the center line of the rotary press. Such engagement of the collars and bushings is shown in FIG. 7. As can also be seen in FIG. 7, the wheels 62 on which the tablet movers 61 are mounted are rubber loaded wheels. These wheels are formed of an outer cylinder 86 made of a hard material such as steel, a middle cylinder 87 made of a resilient material such as rubber, and an inner cylinder 88 made of a bearing material such as bronze. As the tablet movers are mounted on rubber loaded wheels, the tablet movers adjust themselves automatically so that the collars 84 fit tightly about the bushings 83 and engage the bushings on either side of the planes joining the center line of the rotary press and the center lines of the bushings as is shown in FIG. 7. Thus, the tablet movers can be accurately positioned relative to the bushings and hence the tablet pockets can be accurately positioned relative to the die cavities.

If desired, the bushings 83 may be dispensed with and the shanks of upper punches 28 can be used as bushings to engage the collars 84 of the tablet movers. However, I prefer to employ bushings which are fixedly secured to the punch guide block 31 such as bushings 83.

While the tablet movers of the invention and the means of the invention for aligning the tablet pockets and the die cavities can be used either independently or in combination with tablet delivery devices generally, they are advantageously used with the tablet delivery device of the invention. When so used, as is shown in the drawings, as the die cavities enter upon the working flight 64, the bushings 83 engage the tablet mover collars 84 and this engagement is maintained throughout the travel of the tablet movers along the working flight. Thus, chain 63 is driven over the chain track 59 by the bushings 83, and the tablet movers are moved along the working flight so that the tablet pockets travel over an arc portion of the die cavity path in accurate alignment with the die cavities and at the speed at which the die cavities move.

The conditions which exist at various points along the arc portion of the die cavity path traversed by the tablet movers can be best understood by reference to FIGURE 3, FIGURE 4, FIGURE 5, and FIGURE 6. At the position depicted in FIGURE 4, the tablet mover 61 moves the tablet T contained in the tablet pocket 73 over a thin plate 92 which is fixedly secured to the table 58 (FIG. 2). Plate 92 overlies a portion of the die head upper surface and serves to maintain the tablets out of contact with the die head until they are deposited at the die cavities. This plate is described in detail in United States Patent 2,727,473. A moment after advancing beyond the position depicted in FIG. 4, the tablet pocket 73 moves past the end 93 (FIG. 3) of the plate 92 and into open communication with the die cavity 27 which is filled with coating material M. After the tablet pocket and the die cavity come into open communication, the tablet T is deposited at the die cavity. The tablet falls by gravity and is pushed by the vertical guide 69 from the tablet pocket 73 and comes to rest on the pulverant material M which fills the die cavity. The condition then existing is depicted in FIG. 5. At the position depicted in FIG. 6, lower punch 29 rides on lowering cam 44 (FIG. 3) which drops the level of lower punch 29 in the die cavity and hence lowers the tablet T into the die cavity. As the tablet T is lowered into the die cavity, the vertical guide 69 follows the tablet and maintains it in vertical alignment with the die cavity. Downward travel of the vertical guide is stopped when the lock pin 79 strikes the bottom of slot 78. Thus, the tablet guide just clears the tablet and as the tablet guide moves away from the position shown in FIG. 6, it turns into the return flight 66.

*Tablet feeder*

Figure 13:
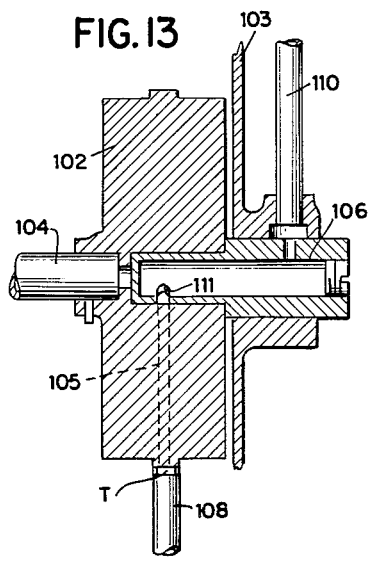
FIG. 13 is a horizontal section partially broken away of the tablet feeder shown in FIG. 1 and taken along line 13—13 of FIG. 1.

The tablet feeder 100 is disposed beneath pick-up station 60. This feeder will be best understood by reference to FIG. 11, FIG. 12 and FIG. 13. The feeder comprises a vertically disposed vacuum wheel 102 which is contained in a casing 103 and is mounted for rotation on a shaft 104. Vacuum tubes 105 extend from the periphery of the vacuum wheel to header 106 which is disposed coaxially with the vacuum wheel 102 and is fixedly secured to casing 103 by setscrew 107. A vacuum pump (not shown) is connected to header 106 by line 110.

As the vacuum wheel 102 rotates, the inner end of a vacuum tube passes over slot 111 in vacuum header 106 and the outer end of the vacuum tube moves into confronting relationship with the exit end 109 of a delivery tube 108 which is filled with tablets T and is fixedly positioned with its exit end 109 adjacent a point in the path of the vacuum tubes 105. The vacuum tube is then under vacuum, and hence a tablet is drawn from the delivery tube onto the outer end of the vacuum tube. The vacuum wheel then carries the tablet around to pick-up station 60. As the tablet T approaches the pick-up station, it passes over the ends of the inclined fingers 94 which extend out from plate 92 over slot 113 which is disposed in table 58 and plate 92 in alignment with the vacuum wheel. As the tablet moves into the station, the fingers engage it and lift it off the vacuum tube. If desired, to assist in removal of the tablet from the vacuum wheel the slot 111 in the vacuum header 106 can be terminated at the point such that the vacuum in the vacuum tube breaks when the tablet T arrives at the pick-up station. The tablet remains at the pick-up station until a tablet mover 61 moves through the pick-up station and takes it away.

The movement of the tablet movers 61 and the rotation of the vacuum wheel 102 is coordinated by gearing 112 (FIG. 1) which drives the vacuum wheel so that each time a tablet is delivered to the pick-up station, a tablet mover moves through the station. An electromagnet 101 (FIG. 1) disposed above the pick-up station raises the vertical guides 69 of the tablet movers and the horizontal guides then scoop the tablets into the tablet pockets 73.

As is indicated in FIG. 2, orientation and delivery of tablets to delivery tube 108 may be effected with a vibratory tablet orientation device 114, such as a Peeco Feeder manufactured by Perry Equipment Co. of Erie, Pa. Such an orientation device is adapted to take tablets from a hopper 116, orient them, and then feed them into the delivery tube.

If desired, the vacuum wheel can be disposed horizontally instead of vertically. The vacuum tubes could then extend from adjacent the center of the vacuum wheel to a point in the upper surface of the horizontally disposed wheel and it would then be necessary for the vacuum wheel to merely move the tablets horizontally from a delivery tube disposed over the wheel to the pick-up station. I prefer, however, to dispose the vacuum wheel vertically.

Figure 14:
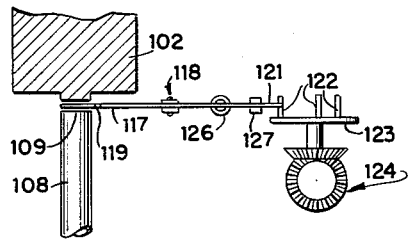
FIG. 14 is a plan view of a reciprocating gate adapted for use with a table feeder of the type depicted in FIG. 13.
Figure 15:
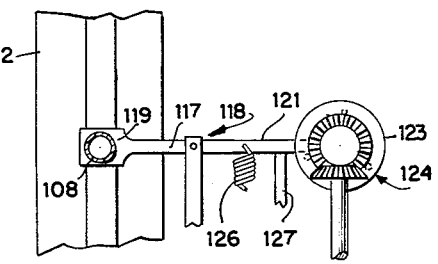
FIG. 15 is an elevation of the reciprocating gate shown in FIG. 14.

In the embodiment shown in the drawings, tablets are prevented from falling out of the delivery tube 108 before removal by vacuum tubes 105 by the proximity of the vacuum wheel to the delivery tube which causes the end tablet in the delivery tube to rub against the vacuum wheel. An alternative means of retaining the tablets in the delivery tube until picked up by the vacuum tubes is to provide the delivery tube with a reciprocating gate as is shown in FIG. 14 and FIG. 15. A gate arm 117 centrally pivoted as shown at 118 is positioned with its working end 119 adjacent the exit end 109 of the delivery tube 108. The driven end 121 of the gate arm is disposed in the path of cams 122 mounted on cam wheel 123. The cam wheel is driven by gearing 124 in time relationship with the rotation of vacuum wheel 102. The cams actuate the gate arm causing the working end 119 of the gate arm to reciprocate and alternately open the exit end of the delivery tube permitting a tablet to be withdrawn by a vacuum tube, and close the exit end of the delivery tube to prevent tablets from falling out. Following actuation of the gate arm by one of the cams 122, a spring 126 returns the gate arm to the stop 127.

If the vacuum wheel is disposed horizontally instead of vertically, the vacuum wheel may be allowed to rub against the end tablet in the delivery tube and a reciprocating gate may be employed to prevent the end tablet being withdrawn by the vacuum wheel until a vacuum tube comes into confronting relation with the delivery tube.

*Inspection device*

In the operation of a rotary coated tablet press, if for some reason the tablet delivery device fails to deposit a tablet at one of the die cavities, pulverant coating material present in the die cavity as the cavity enters compression position D will be compressed at this position and there will be formed therefrom a product having the appearance of a coated tablet but containing no tablet. This imperfect production will be ejected from the die cavity at ejection position E, and would then normally be removed from the press and directed to collection point 56 at removal position G. To preclude commingling of such production with coated tablets gathered at collection point 56, the invention provides an inspection device which checks the operation of the tablet movers and routes imperfect production away from the collection point 56.

The inspection device of the invention will be best understood by reference to FIG. 2, FIG. 3 and FIG. 4 of the drawings. The inspection device comprises level indicators installed one on each of the tablet movers 61, a rejector 131 positioned at rejection position F, and time delay means 130 for coordinating the action of the level indicators and the rejector. The lock pins 79 of the tablet movers 61 can conveniently be employed as level indicators since the lock pins are connected to the vertical guides 69 which are disposed over the tablet pockets and rest on tablets present in the tablet pockets. The rejector 131 comprises compressed air line 132 which is provided with solenoid operated valve 133. The ccordinating means is of the type described in my copending application Serial No. 636,678, filed January 28, 1957, and now U.S. Patent No. 2,906,214 dated September 29, 1959, and comprises memory wheel 134 which is indexed to the rotary press, switch 136 in the line connecting the solenoid of the valve 133 with power source 137, and a solenoid 138 which is connected to the power source 137. Solenoid 138 is connected by arm 139 with contact 141 which is positioned just rearward of the point at which the tablet pockets come into open communication with the die cavities and at an elevation such that the lock pin of a tablet mover will strike the contact if there is no tablet in the tablet pocket. The vertical guides are grounded as is indicated schematically at 142. Thus, if there is no tablet in a tablet pocket, the lock pin will strike the contact 141 and the circuit through the solenoid 138 will close. Upon closing, the solenoid 138 impresses the memory wheel 134, and when the die cavity which would have received a tablet had the tablet pocket contained one arrives at the rejection position F the memory wheel opens switch 136. The solenoid of valve 133 then becomes deenergized, the valve opens and compressed air blows the imperfect product ejected from the die cavity at rejection position E into chute 143.

Advantageously the arm 139 is provided with an upper contact 144 (FIG. 3) disposed so that a lock pin will strike it if the level in the tablet pocket 73 is too high. Thus, if the tablet contained in the tablet pocket is cocked the inspection device will reject the product containing this tablet.

Further, if desired, a third contact may be positioned at a point along the path of the tablet guides ahead of the point at which the tablet guides come into open communication with the die cavities and disposed so that the lock pin will strike it if at this point the level indicator has not dropped to a position corresponding to an empty tablet pocket. Thus, if for some reason a tablet contained in the tablet pocket is not deposited at the die cavity the rejection device will reject the resulting imperfect product.

I claim:

1. A rotary coated tablet press comprising a rotating die head having a die cavity, means for rotating said die head to carry said die cavity through an acruate path, tablet delivery means for delivering a tablet to the die cavity, said tablet delivery means comprising a tablet mover having a tablet pocket, a fixedly mounted track, said tablet mover being mounted on said track to bear against said track and to move therealong in guiding contact therewith, said track having consecutively an approach flight, a working flight and a return flight, said approach flight disposed between a position removed from the path of said die cavity and a position adjacent to the path of said die cavity, said return flight disposed between another position adjacent to the path of the die cavity and a position removed from said path, said working flight located adjacent to the path of said die cavity between said positions adjacent thereto and having the shape of a finite arc with its center of generation located on the axis of rotation of said rotary die head, means for positioning asid tablet mover to bear against said working flight and to align the tablet pocket of said tablet mover vertically above said die cavity, means for driving said tablet mover along said track including said approach flight, working flight and return flight with the same angular velocity along said working flight as said die cavity, and means for lowering the tablet relative to the tablet mover after deposit of the tablet at the die cavity while the tablet pocket is moved along said working flight.

2. In a rotary coated tablet press comprising a horizontally disposed rotating die head with vertical die cavities extending therethrough, a tablet delivery means comprising tablet movers having tablet pockets and joined together forming an endless chain, an endless chain track for the tablet movers fixedly mounted and disposed to direct the tablet pockets into vertical alignment with the path of the die cavities, along an arc portion of the die cavity path and then away from vertical alignment with the die cavity path, drive means for driving the chain of tablet movers over the chain track so that the tablet pockets along the arc portion are vertically aligned with die cavities, means for bringing the tablet pockets into open communication with the die cavities along the arc portion.

3. The rotary coated tablet press of claim 2 wherein each of the tablet movers has a body portion, a horizontal guide for guiding a tablet horizontally and a vertical guide for guiding a tablet vertically, the horizontal guide being secured to the bottom of said body portion and bounding the tablet pocket, the vertical guide being slidably mounted for vertical movement in the body portion and aligned with the tablet pocket and having a working pin adapted to rest on a tablet contained in the tablet pocket and a weight resting on the working pin urging it downwardly when the pin rests on a tablet contained in the tablet pocket.

4. In a rotary press comprising a rotating die head having a die cavity, the improvement which includes a bushing aligned with the die cavity and secured to the die head, tablet delivering means for delivering a tablet to the die cavity, said tablet delivery means comprising a tablet mover having a tablet pocket and being mounted on rubber loaded wheels, a track for said wheels fixedly positioned adjacent the die head and disposed to direct the tablet pocket into vertical alignment with the path of the die cavity, means for driving the tablet mover over said track in time relationship with the rotating die head, and means for aligning the tablet pocket and die cavity comprising a collar rigidly secured to the tablet mover and disposed to engage said bushing simultaneously on each side of a plane passing through the center line of the bushing and the center line of the rotary press.

5. The combination of claim 4 wherein the tablet mover comprises a lock pin fixedly secured to the vertical guide and projecting into a vertical slot disposed in the body portion whereby rotation of the vertical guide relative to the body portion is prevented.

6. The rotary press of claim 4 wherein the tablet mover has a body portion, a horizontal guide for guiding the tablet horizontally and a vertical guide for guiding the tablet vertically, the horizontal guide being secured to the bottom of said body portion and bounding the tablet pocket, the vertical guide being slidably mounted for vertical movement in the body portion and aligned with the tablet pocket and having a working pin adapted to rest on a tablet contained in the tablet pocket and a weight resting on the working pin urging it downwardly when the pin rests on a tablet contained in the tablet pocket.

7. The rotary press of claim 6 wherein the tablet guide comprises a lock pin fixedly secured to the vertical guide and projecting into a vertical slot disposed in the body portion whereby rotation of the vertical guide relative to the body portion is prevented.

8. The combination of a rotary coated tablet press comprising a rotating die head having a die cavity and tablet delivery means for delivering a tablet to the die cavity, said tablet delivery means comprising a tablet mover having a tablet pocket and formed with a body portion, a horizontal guide for guiding the tablet horizontally and a vertical guide for guiding the tablet vertically, the horizontal guide being secured to the bottom of said body portion and formed to bound the tablet pocket, the vertical guide being slidably mounted for vertical movement in the body portion and aligned with the tablet pocket and having a working pin adapted to rest on a tablet contained in the tablet pocket and a weight resting on the working pin urging it downwardly when the pin rests on a tablet contained in the tablet pocket, and means for driving the tablet mover over the die cavity bringing the tablet pocket into open communication with the die cavity.

9. A rotary coated tablet press comprising a horizontally disposed rotating die head with vertical die cavities extending therethrough, a fixedly secured cam track disposed beneath the die cavities, vertically movable lower punches mounted for rotation with the die head and aligned one with each die cavity, the upper ends of the lower punches extending into the die cavities and the lower ends thereof riding on the cam track, vertically movable upper punches mounted for rotation with the die head and aligned one with each die cavity, each of the upper punches being mounted in a bushing secured to the die head, coating material filling means for filling each die cavity with coating material, tablet delivery means ahead of the coating material filling means for delivering a tablet to each die cavity, said tablet delivery means comprising tablet movers having tablet pockets, said tablet movers being mounted on rubber loaded wheels joined together forming an endless chain, an endless chain track for the rubber loaded wheels fixedly mounted and disposed to direct the tablet pockets into vertical alignment with the die cavity path, drive means an arc portion of the die cavity path and then away from vertical alignment with the die cavity pth, drive means for driving the chain of tablet movers over the chain track off the die head, said drive means comprising collars each rigidly secured to a tablet mover and disposed to engage a die head bushing simultaneously on each side of a plane passing through the center line of the bushing and the center line of the rotary press, said collars being positioned on the tablet guides so that the tablet pockets along the arc portion are aligned with die cavities whereby the tablet pockets are moved along the arc portion at the speed of the die cavities, means for bringing the tablet pockets into open communication with the die cavities along the arc portion, the portion of the cam track associated with the arc portion being formed to maintain the punches at a level holding the die cavities full of tablet coating material until the die cavities come into open communication with the tablet pockets and thereafter lower the punches to lower tablets into the die cavities whereby the tablets are lowered into the die cavities before the tablet movers are moved out of vertical alignment with the path of the die cavities.

10. The rotary coated tablet press of claim 9 wherein each of the tablet movers has a body portion, a horizontal guide for guiding a tablet horizontally and a vertical guide for guiding the tablet vertically, the horizontal guide being secured to the bottom of said body portion and bounding the tablet pocket, the vertical guide being slidably mounted for vertical movement in the body portion and aligned with the tablet pocket and having a working pin adapted to rest on a tablet contained in the tablet pocket and a weight resting on the working pin urging it downwardly when the pin rests on a tablet contained in the tablet pocket.

11. An inspection device for a rotary coated tablet press having a horizontally disposed rotating die head with vertical die cavities extending therethrough, at least one coating material filling device for filling each die cavity with a charge of coating material, tablet delivery means for delivering a tablet to each die cavity, compression means ahead of the coating material filling means and the tablet delivery means for compressing coating material and the tablet contained in each die cavity to form therefrom a coated tablet, removal means ahead of the compression means for removing coated tablets from the rotary press and directing coated tablets to a collection point, rejection means ahead of the last coating material filling device and the tablet delivery means for routing imperfect production away from the collection point, said tablet delivery means comprising tablet movers each having a tablet pocket for containing a tablet and being adapted to move a tablet horizontally over the die head and deliver it to a die cavity, said inspection device comprising level indicators installed one on each of the tablet movers, each level indicator being adapted to indicate the level in the tablet pocket with which it is associated, a time delay unit responsive to each of the level indicators, the time delay unit being effective to operate the rejector when the imperfect production arrives at the rejector.

12. A tablet feeder for separating individual tablets from a collection thereof and delivering each tablet individually to a pick-up station, said feeder comprising a vacuum wheel having a vacuum tube extending from adjacent the center thereof to the periphery thereof, means for applying a vacuum to said vacuum tube, a tablet delivery tube adapted to contain a stack of tablets and having the exit end thereof positioned adjacent a point in the path of the outer end of said vacuum tube, and means for rotating said wheel whereby tablets are taken one at a time by the vacuum tube from the delivery tube and are transferred to the pick-up station.

13. In combination with the tablet feeder of claim 12, a vibratory tablet orientation device connected to the delivery tube for supplying tablets thereto.

14. A tablet feeder for separating individual tablets from a collection thereof and delivering each tablet individually to a pick-up station, said feeder comprising a vacuum wheel having a vacuum tube extending from adjacent the center thereof to the periphery thereof, means for applying a vacuum to said vacuum tube, a tablet delivery tube adapted to contain a stack of tablets and having the exit end thereof positioned adjacent a point in the path of the outer end of said vacuum tube, a gate at the exit end of said delivery tube, means for rotating said wheel and means for opening and closing said gate in time relationship with wheel rotation whereby the gate opens permitting a tablet to be taken by the vacuum tube from the delivery tube and closes to retain tablets in the tube for subsequent delivery to the wheel.

15. In combination with the tablet feeder of claim 14, a vibratory tablet orientation device connected to the delivery tube for supplying tablets thereto.

16. A rotary coated tablet press comprising a horizontally disposed rotating die head with vertical die cavities extending therethrough, a first coating material filling means for successively filling each die cavity with a first charge of coating material, tablet delivery means for delivering tablets successively to each die cavity to deposit said tablets on said first charge of material, compression means for successively compressing the coating material charges and the tablet in each die cavity to form a coated tablet, ejection means for successively ejecting the coated tablet from each die cavity, removal means for removing coated tablets ejected by said ejection means to a collection point and normally inoperative rejection means actuatable to divert ejected tablets from said collection point, said tablet delivery means including tablet movers having tablet pockets, drive means for moving each said tablet mover successively along a path toward the path of the die cavities into vertical alignment with the path of the die cavities and then away from alignment with the die cavity path, a horizontally disposed plate positioned beneath the path of the tablet movers, extending toward the die cavities, overlying the die head and terminating at a point of vertical alignment of said tablet movers above said die cavities whereby each tablet pocket is successively brought into open communication with a die cavity, each of said tablet movers having a body portion, a horizontal guide for guiding the tablet horizontally and a vertical guide for guiding the tablet vertically, the horizontal guide being secured to the bottom of said body portion and bounding the tablet pocket, the vertical guide being slidably mounted for vertical movement in the body portion and aligned with the tablet pocket and having a working pin adapted to rest on the tablet contained in the tablet pocket and a weight resting on the working pin moving it downwardly when the pin rests on a tablet contained in the tablet pocket, a tablet pick-up station disposed in the path of the tablet movers toward said die cavities, a lifting device for raising the vertical guides at the pick-up station, tablet feed means for delivering an individual tablet to each tablet pocket at the pick-up station, said tablet feed means being adapted to separate individual tablets from a collection thereof and to deliver each tablet individually to the pick-up station in time relationship with the travel of the tablet movers past the pick-up station, an inspection device comprising level indicators installed one on each of the tablet vertical guides, each level indicator being adapted to indicate the level in the tablet pocket with which it is associated, a time delay unit responsive to each of the level indicators, the time delay unit being effective to actuate the ejection means when the imperfect production is received at the rejection means.

17. A tablet feeder which includes tablet movers having tablet pockets, drive means for moving each said tablet mover successively along a path, each of said tablet movers having a body portion, a horizontal guide for guiding the tablet horizontally and a vertical guide for guiding the tablet vertically, the horizontal guide being secured to the bottom of said body portion and bounding the tablet pocket, the vertical guide being slidably mounted for vertical movement in the body portion and aligned with tablet pocket and having a working pin adapted to rest on a tablet contained in a tablet pocket and a weight resting on the working pin urging it downwardly when the pin rests on a tablet contained in the tablet pocket, a tablet pick-up station disposed in the path of the tablet movers, a lifting device for raising the vertical guides at the pick-up station, tablet feed means for delivering an individual tablet to each tablet pocket at the pick-up station, said tablet feed means being adapted to separate individual tablets from a collection thereof and to deliver each tablet individually to the pick-up station in time relationship with the travel of the tablet movers past the pick-up station, an inspection device comprising level indicators installed one on each of the vertical guides, each level indicator being adapted to indicate the level in the tablet pocket with which it is associated.

18. A tablet feeder which includes tablet movers having tablet pockets, drive means for moving each said tablet mover successively along a path, each of said tablet movers having a body portion, a horizontal guide for guiding the tablet horizontally and a vertical guide for guiding the tablet vertically, the horizontal guide being secured to the bottom of said body portion and bounding the tablet pocket, the verical guide being slidably mounted for vertical movement in the body portion and aligned with the tablet pocket and having a working pin adapted to rest on a tablet contained in the tablet pocket and a weight resting on the working pin urging it downwardly when the pin rests on the tablet contained in the tablet pocket, a tablet pick-up station disposed in the path of the tablet movers, a lifting device for raising the vertical guides at the pick-up station, tablet feed means for delivering an individual tablet to each tablet pocket at the pick-up station, said tablet feed means being adapted to separate individual tablets from a collection thereof and delivering each tablet individually to the pick-up station, the tablet feed means comprising a vacuum wheel having a vacuum tube extending from adjacent the center thereof to the periphery thereof, means for applying a vacuum to said vacuum tube, a tablet delivery tube adapted to contain a stack of tablets and having the exit end thereof positioned adjacent a point in the path of the outer end of said vacuum tube, and means for rotating said wheel in time relationship with the travel of the tablet movers past the pick-up station, whereby tablets are taken by the vacuum tube from the delivery tube and are transferred individually to the pick-up station, an inspection device comprising level indicators installed one on each of the tablet vertical guides, each level indicator being adapted to indicate the level in the tablet pocket with which it is associated.

References Cited in the file of this patent

UNITED STATES PATENTS

| | | |
|---|---|---|
| 352,466 | Huttemeyer | Nov. 9, 1886 |
| 568,488 | Noyes | Sept. 29, 1896 |
| 582,794 | Noyes | May 18, 1897 |
| 641,706 | Kraemer | Jan. 23, 1900 |
| 1,248,571 | Stokes | Dec. 4, 1917 |
| 2,170,520 | Raynolds | Aug. 22, 1939 |
| 2,700,938 | Wolff et al. | Feb. 1, 1955 |
| 2,727,473 | Wolff et al. | Dec. 20, 1955 |
| 2,849,965 | Stott | Sept. 2, 1958 |